March 13, 1934.  N. W. RHYNE  1,950,815
MEANS FOR TRUING BRAKES
Filed May 29, 1929  3 Sheets-Sheet 1
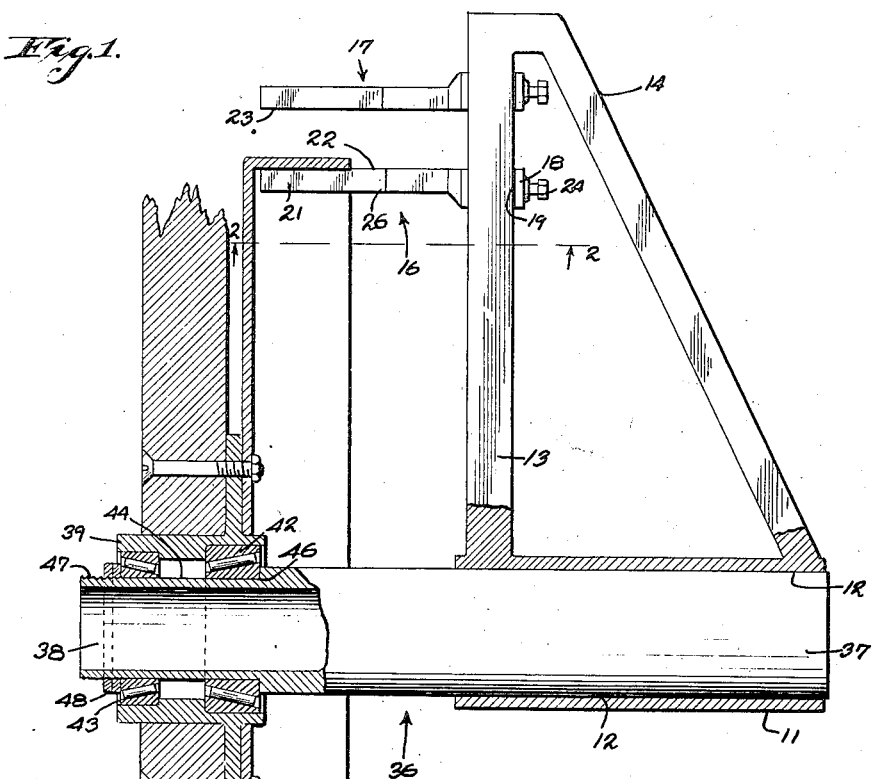
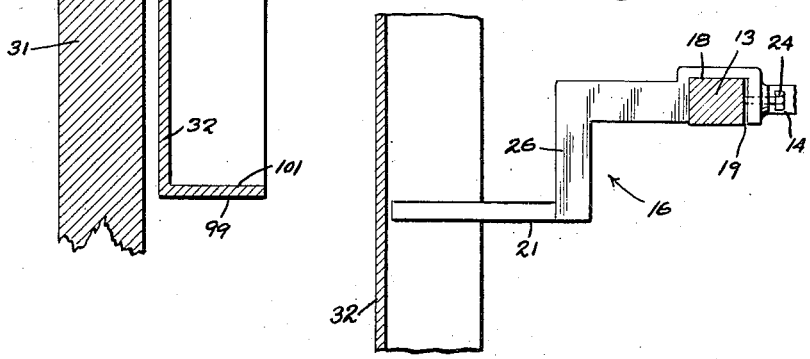

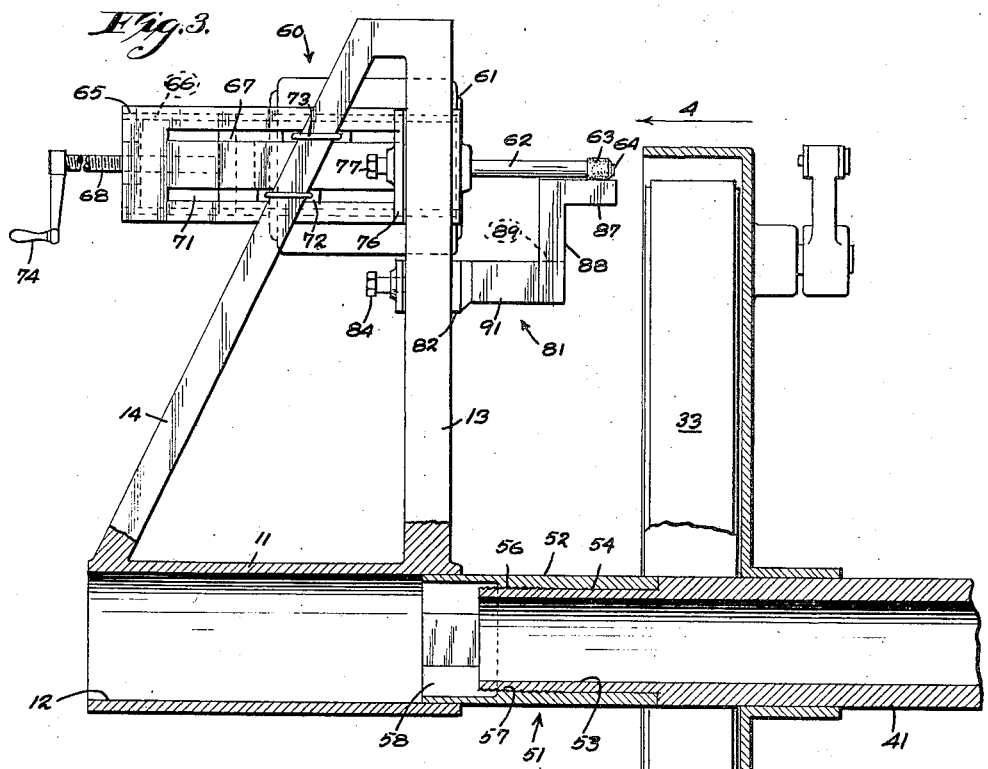
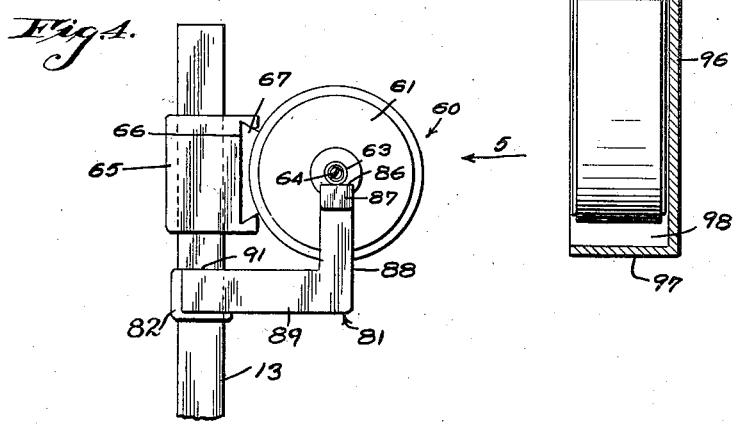

March 13, 1934.   N. W. RHYNE   1,950,815
MEANS FOR TRUING BRAKES
Filed May 29, 1929   3 Sheets-Sheet 3
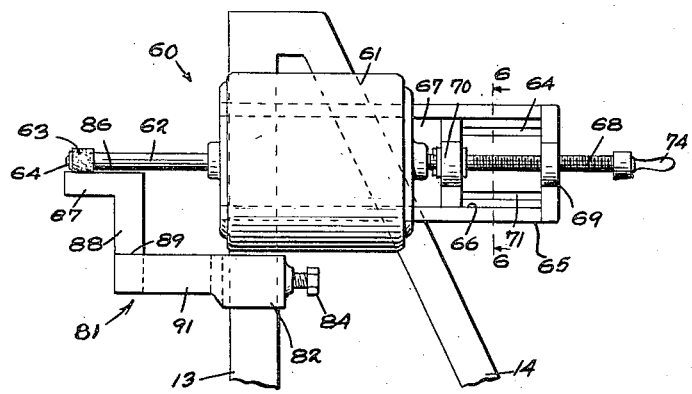
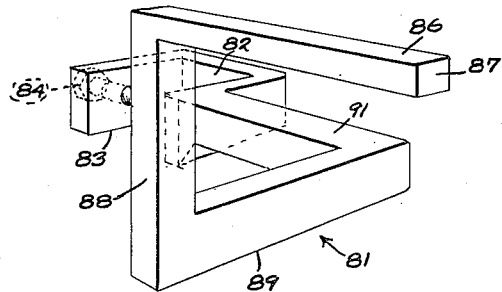
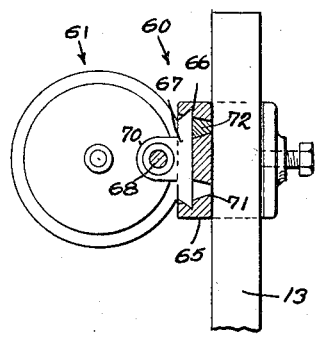
Inventor
Newell W. Rhyne.
by Hazard and Miller
Attorneys Patented Mar. 13, 1934

1,950,815

UNITED STATES PATENT OFFICE 1,950,815

MEANS FOR TRUING BRAKES

Newell W. Rhyne, San Bernardino, Calif.

Application May 29, 1929, Serial No. 366,927

1 Claim. (Cl. 51—241)

My invention relates to a mechanism for truing brakes.

An object of the invention is the provision of means for setting, with a high degree of accuracy, the friction elements of a braking mechanism, and more particularly, the friction elements of a vehicle braking mechanism.

A more detailed object is the provision of means of the general character indicated, particularly adaptable for use in the operation of truing the friction elements of internal expanding vehicle braking mechanisms.

A more detailed object is the provision of means capable of being mounted for free rotation axially of the circularly arranged internal expanding friction elements of a vehicle braking mechanism, whereby any deviation of the braking area of the friction elements, from true circular configuration, may readily be ascertained.

Another object is the provision of cutting means capable of being adjustably mounted in a similar manner, whereby any such deviation may readily be corrected, so as to yield a truly circular arrangement of the friction elements, the purpose being to cause the friction elements to conform with a high degree of precision, to the braking surface of the brake drum while in operation.

A still further object is the provision of means for setting the cutting means to an effective radial distance from the axis of rotary movement thereof, which coincides exactly with the radius of the drum cooperative with the friction elements.

A still further object is the provision of deviation ascertaining means, and deviation correcting means, as above described, of such a nature that they may be applied to the conventional internal expanding friction elements, without being interferred with by the annular brake mechanism housing employed upon many automobiles, to exclude dirt, grease, water, and the like, from the operative parts of the braking mechanism.

A still further object is the provision of a device as above set forth, applicable to both front and rear wheel brakes, and applicable over a wide range of different types and sizes of braking mechanisms. In elucidation of this last mentioned object, it should be pointed out that the widening of the range of adaptability of the means of my invention, is effected by means of a plurality of interchangeable sleeves and mandrels, as will be explained in greater detail hereinbelow.

The invention possesses other objects and advantageous features, some of which, with those enumerated, will be set forth in the following description of the invention's particular embodiment which is illustrated in the drawings accompanying and forming a part of the specification.

Referring to the drawings:

Figure 1 is a vertical, medial, sectional view taken through a vehicle wheel and its associated brake drum, having mounted thereon, that portion of the apparatus of my invention whereby the radius of the braking surface of the drum is ascertained;

Fig. 2 is a horizontal, sectional view of a portion of the structure shown upon Fig. 1, the plane of section being taken upon the line 2—2 of Fig. 1, with the direction of view as indicated by the arrows;

Fig. 3 is a vertical, medial, sectional view of the braking mechanism with which the drum of Fig. 1 is adapted to cooperate, portions thereof being shown in elevation and showing that portion of the apparatus of my invention for cutting the friction elements to true circular configuration.

Fig. 4 is a view in end elevation, of the cutting mechanism of Fig. 3, the direction of view being indicated by the arrow 4 of that figure; and a portion of the figure is broken away to reduce its length;

Fig. 5 is a view in side elevation, of the structure shown upon Fig. 4, the direction of view being indicated by the arrow 5 of that figure;

Fig. 6 is a vertical, transverse, sectional view, the plane of section being indicated by the line 6—6 of Fig. 5, with the direction of view as indicated by the arrows;

Fig. 7 is a perspective view of one of the gauges which forms one of the constituent elements of the apparatus of my invention.

In terms of broad inclusion, the present invention, for truing the friction elements of braking mechanisms having cooperatively associated therewith, a brake drum to be engaged by the friction elements in developing braking action, comprises mounting an arm for rotation about an axis coincident with that of the brake drum, and affixing thereto a gauge in such position that the gauge engages the braking surface of the drum, thereby determining the true effective radius of that drum. The arm is then removed from the brake drum, and a second, opposed gauge affixed thereto with its working face in engagement with the working face of the first gauge, whereupon the first gauge is removed from the arm, leaving the second gauge with its working face in a position corresponding to a portion of the braking surface of the brake drum. The arm is then mounted for rotation about an axis coincident with that about which the drum turns when mounted in operative position in respect to the friction elements, with the result that the relative positions of the friction elements and the braking surface of the drum, may readily be ascertained by comparing the position of the gauge then carried by the arm, with the friction elements. This may be done by visual observation, or by proper instruments such as calipers, or a thickness gauge. If this comparison of the friction elements with the gauge, indicates that they have become worn or misplaced from true circular configuration, to such an extent that adjustment by the normal adjusting mechanism is impossible or impracticable, a grinding device may be substituted for the gauge, means being provided for positioning the grinder accurately so that its effective radial distance from the axis about which the arm rotates, coincides accurately with the radius of the brake drum. The friction elements should then be adjusted so that their working surfaces extend beyond the position indicated by the radius determining gauge. The arm and grinder mounted thereupon, may then be activated, turning the arm about the axis around which the friction elements are circularly arranged. This will result in cutting away those portions of the friction elements which extend beyond the circumference of the circle, the diameter of which is equal to that of the braking surface of the drum, thus resulting in the development of a working surface on the friction elements, which accurately coincides with that of the brake drum.

It should here be brought to attention that an inherent disadvantage of internal expanding brakes for automobiles, lies in the difficulty of accurately adjusting the friction elements. Particularly true is this in those cases where the friction elements are in the form of "self-energizing" brake shoes, wherein the friction element is composed of a plurality of shoes, each of which is provided with a suitable friction lining engageable with the inner circumference of the brake drum, to develop the braking action, and one or more of which is floating in such a manner as to be pressed into braking engagement with the drum, by another of the shoes when the pressing shoe is urged into angular displacement by its own engagement with the rotating drum. So great is the force thus developed, pressing the secondary shoe into braking engagement, that this secondary shoe tends to wear very rapidly, and furthermore, the tendency is for this secondary shoe to wear out of true, arcuate configuration, with the result that after such a braking mechanism has been in service for an appreciable length of time, the total area of contact of the friction elements, and particularly of the secondary shoe or shoes, is very materially reduced with a consequent reduction in the efficiency of the entire braking mechanism.

Furthermore, inasmuch as the friction elements are completely enclosed in internal braking mechanisms, the proper alignment of the friction shoes is either very difficult or altogether impossible, because of the fact that observation of the relative position of the shoes and braking surface of the drum, may be had by no means other than through a relatively small aperture in the drum. This aperture is so small that it permits observation of but a very small portion of the braking shoes at a time, with the result that setting the shoes becomes largely a matter of conjecture. It is to overcome these inherent disadvantages of internal expanding braking mechanisms, that I have devised the method and apparatus of the present invention.

In one of its forms whereby the method of my invention may be carried to completion, the apparatus includes a collar 11 preferably tubular in form, having a cylindrical, and preferably accurately turned or ground bore 12. This collar 11 carries an arm 13 which extends rigidly therefrom, being preferably provided with a suitable brace 14 connecting the outer end of the arm 13 with that end of the collar 11 remote from the end thereof from which the arm 13 extends. The exterior surface of the arm 13 is also preferably accurately machined and of uniform shape and size throughout its effective length. While the cross sectional configuration of the arm 13 is immaterial in so far as its method of employment is concerned, it is herein shown as being rectangular, in the belief that the construction of the arm 13 in such form, will yield a slightly more conveniently operable device, inasmuch as the accurate positioning of the gauges and grinder, to be described hereinbelow, is somewhat facilitated thereby.

Fig. 1 shows a pair of gauges 16 and 17 mounted upon the arm 13. Each gauge includes a socket portion 18 open preferably at one side 19 thereof, to permit insertion upon the arm 13, and an indicating portion 21 extending therefrom. The gauges 16 and 17 are complementarily constructed so that the working faces 22 and 23 respectively, thereof, may be brought into abutment while the two gauges 16 and 17 are mounted upon the arm 13. A set screw 24 is threaded through one side of the socket 18, this side preferably being that which is oposite the side from which the arm 21 extends. As clearly shown upon Fig. 2, the arms 21 of the gauges 16 and 17, are offset by a portion 26 thereof, the portions 26 of both gauges 16 and 17, extending to the same side of the arm 13 when the gauges are mounted thereupon, for the purpose of permitting the working faces 22 and 23 thereof, to be brought together.

Means are provided for journalling the collar 11 upon, and in axial alignment with the wheel 31 carrying the brake drum 32 with which are cooperatively associated the friction elements such as the brake shoes 33 to be adjusted or shaped. An arbor 36, the outer end 37 of which is accurately machined for the journalling thereupon of the collar 11, has its inner end 38 so constructed that it is adapted to be mounted within the hub 39 of the wheel 31, preferably in the same manner as the axle or axle housing 41 upon which the wheel 31 is mounted in running position. Inasmuch as I contemplate utilizing the apparatus for truing braking mechanisms associated with both front and rear wheels, and of a plurality of types of automobiles, it forms a portion of my invention to provide a plurality of arbors 36, the outer ends 37 of which are of the same dimensions, but the inner ends 38 of which are fashioned differently, to be received within the different types of hubs 39. Whereas any suitable means may be employed for mounting the selected arbor 36 axially of the wheel 31, one convenient method of so doing, involves the employment of antifriction bearings 42 and 43, with which the wheel 31 is equipped to revolubly mount the wheel 31 upon the vehicle. For this purpose, the inner end 38 of the arbor, is provided with a portion 44 of reduced diameter, adapted to slidably receive the bearings 42 and 43 thereupon, and terminating in a shoulder 46 against which the bearing 42 abuts. Threads 47 are formed upon the other end of the reduced portion 44, for the reception of nuts 48 which may be tightened against the outer bearing 43, to take up the slack between the arbor 36 and the wheel 31, in a manner readily understood.

My invention also contemplates the provision of a plurality of sleeves, one of which is indicated at 51. The outer surface 52 of each sleeve, is accurately machined to cylindrical configuration, and dimensioned to coincide with the exterior of the outer ends 37 of the arbors 36, permitting reception of the sleeve 51 within the bore 12 of the collar 11. Inasmuch as the wheel 31 shown upon Fig. 1, is one of the rear wheels of an automobile normally journalled upon an extension 53 of the axle housing 41, the axle of this particular vehicle, being of the full floating type, the sleeve 51 associated with the arbor 36 of Fig. 1, has its bore 54 so constructed as to permit reception of the sleeve 51 upon the extension 53, rigidly, and in accurate concentricity therewith. Internal threads 56 are formed adjacent the outer end of the sleeve 51, engageable with the threads 57 upon the extension 53 of the housing 41, which are normally employed for the reception of a nut to retain the wheel 31 against displacement from operative position. To facilitate in mounting the sleeve 51 upon the extension 53, and removal of the sleeve therefrom, any suitable wrench-receiving portion 58 is formed at the outer end of the sleeve 51, this portion 58 however, being of such a nature that it does not preclude inserting the collar 11 over the outer end of the sleeve 51, as clearly shown upon Fig. 3. It will be readily understood that where the wheel 31 is of a different type, say for example, a front wheel, or a wheel which is fastened directly to the axle instead of to the axle housing, a sleeve 51 and an arbor 36, will be selected, wherein those portions 52 and 37 respectively, are identical with those described, to permit insertion thereupon, of the collar 11; but the bore 54 and the inner end 38 of the selected sleeve 51 and arbor 36 respectively, are of different characteristics to accommodate the particular type of wheel and mounting encountered.

A grinder indicated in its entirety at 60 is also adapted to be adjustably mounted upon the arm 13. This grinder is in the form of a motor 61 having its shaft 62 extended and adapted to receive an emery wheel 63 upon the outer end thereof, a screw 64 or its equivalent, being employed to releasably retain the emery wheel 63 in operative position. The motor 61 is mounted upon a carriage 65 having a dovetail slot 66 within which is received a V block 67 rigid with the housing of the motor 61. The major axes of the V block 67 and dovetailed slot 66, extend in a plane to which the axes of the arm 13 is perpendicular, as clearly shown upon Fig. 4, and mans for adjusting the grinder 60 with its emery wheel 63 in this plane, are provided in the form of a screw shaft 68 threaded through a lug 69 carried by the carriage 65, and is swivelled to a lug 70 rigid with the V block 67 and extending therefrom. A pair of spaced slots 71 are formed in the side of the carriage 65, opposite that in which the slot 66 is formed, these slots 71 being in parallelism with each other and with the major axis of the slot 66 and V block 67. A block 72 is slidable within each slot 71, and each block 72 carries an eye 73 which is rigid therewith and extends therefrom to encircle the brace 14, the purpose being to provide guides adapted to assist in holding the motor carriage 65 more rigidly in adjusted position upon the arm 13, and reduces to a minimum, any vibration thereof, caused by operation of the motor 61 and emery wheel 63. The screw shaft 68 is provided with a handle 74 at its outer end, whereby rotation of the shaft 68 is facilitated to advance or retract the motor 61 and emery wheel 63. The carriage 65 is also provided with a socket 76 within which the arm 13 is receivable, and a set screw 77 whereby the motor carriage 65 may be securely and releasably clamped to the arm 13 in selected position.

An auxiliary gauge 81 is provided for use in cooperation with the grinder 60. This gauge 81 is best shown upon Fig. 7, and is provided with a socket 82 open at one side 83 to permit insertion thereof upon the arm 13, and a set screw 84 whereby the gauge may be securely clamped to the arm 13 in selected position. The working face 86 of the gauge 81, is the upper side of an indicating finger 87 which is provided with three offsets 88, 89, and 91 respectively. The offset 91 extends from the socket 82, preferably from the side thereof opposite that in which the set screw 84 is threaded; the offset 89 extends laterally from the outer end of the offset 91; and the offset 88 extends vertically from the outer end of the offset 89, with the finger 87 extending from the upper end of the offset 88 in parallelism with the offset 91. The combined length of the offset 91 and the finger 87, is such that the working face 86 of the finger 87, is adapted to engage the emery wheel 63, as clearly shown on Figs. 3 and 5; and the offset portion 88 is also proportioned to permit the grinder 60 to be slid downwards upon the arm 13 until the emery wheel 63 engages the working face 86 of the finger 87, thus compensating for the fact that the carriage 65 is of such width that a straight gauge could not be brought into engagement with the emery wheel 63 while both the grinder and gauge were mounted on the arm 13. The offset portion 89 is of such length that it compensates for the lateral displacement of the shaft 62 upon which the emery wheel is mounted, which is equal to the radius of the motor housing, plus the thickness of the carriage 65, which is between the arm 13 and under side of the motor housing.

Many internal expanding braking mechanisms are enclosed within a housing such as the housing 96 shown upon Fig. 3 as being rigidly mounted upon the axle housing 41. This housing or dust cover, is for the purpose of excluding dirt, water, oil, and the like, from the braking mechanism, and is provided at its periphery, with an annular flange 97. The space 98 between the flange 97 and the braking faces of the friction elements 33, is usually only slightly greater than the thickness of the flange 99 of the brake drum 32, against the inner circumference 101 of which the friction elements 33 are adapted to engage in developing the braking action. For this reason, the shaft 62 of the motor 61, and the emery wheel 63, are of sufficiently small diameter to permit their being inserted into the space 98, thus making it possible to grind the braking area of the friction elements 33 after they have been properly adjusted, and without the necessity of their being removed from operative position within the housing 96. Furthermore, one of the gauges 16 or 17, is made sufficiently thin, to permit its indicating portion 21 to be inserted into the space 98; and for the sake of uniformity, it is preferable to construct both gauges 16 and 17, as well as the gauge 81, in the same manner. This adds to the convenience of utilizing the gauges, in that any one thereof, may be employed when it is desired to test the friction elements 33 in respect to their true circular arrangement.

Method of operation

Inasmuch as my invention may be used regardless of the type of internal expanding brake, and regardless of whether the brake is associated with a front or rear wheel, it will suffice for the purpose of the present disclosure, to describe the use of the device in connection with the rear wheel 31 carrying the brake drum 32, and associated with the friction elements 33. It should be understood however, that the same apparatus may be employed for truing other types of brakes.

After that portion of the automobile normally supported by the wheel 31, has been jacked up or otherwise temporarily supported to raise the wheel 31 from the supporting surface, the wheel 31 should be removed from its journal on the axle housing 41. The proper arbor designed for use with the particular type of wheel 31, should then be selected and mounted within the hub 39, the bearings 42 and 43 being employed so as to mount the arbor in the same manner as the axle housing 41 is received within the wheel when the wheel is in operative position upon the vehicle. Thus the arbor 36 will be disposed in true axial alignment with the wheel 31, and permit mounting of the collar 11 thereupon for rotation about an axis coincident with that of the flange 99 of the brake drum 32.

The gauge 16 should then be affixed to the arm 13 and the parts so arranged that the indicating portion 21 extends into the drum 32 and just engages the inner circumference 101 of the flange 99. By rotating the collar 11 about the axis of the wheel, it may readily be ascertained whether or not the drum 32 has been worn or warped from true circular configuration; and if it is found that the flange 99 is not truly circular, this condition should be corrected before the friction elements 33 are treated. This correction of the drum 32, should be carried out in any convenient manner, either by mounting the wheel and drum in a drum-truing lathe, or by mounting the grinder 60 upon the arm 13, so that the emery wheel 63 engages the inner circumference 101, starting the motor 61 and then moving the parts so that the emery wheel 63 engages all portions of the surface 101 to grind away any portions disposed at a less radius than any other portions.

After the drum 32 has been corrected for any deviation from circularity, the gauge should be affixed to the arm 13, with the collar 11 mounted upon the arbor 36 and the set screw 24 tightened so as to securely lock the gauge 16 with the outer face of its indicating portion 21 just touching the inner circumference 101 of the flange 99. The collar 11 should then be removed from the arbor 36, without disturbing the setting of the gauge 16, and the gauge 17 should then be mounted upon the arm 13 beyond the gauge 16 from the collar 11, and then slid inwards on the arm 13 until the inner face of its indicating portion 23 just engages the corresponding portion of the gauge 16, whereupon the gauge 16 should be removed. It will thus be understood that the inner face of the indicating portion 23 of the gauge 17, presents a small area at a radial distance from the axis of the collar 11, which is exactly equal to the radius of the inner circumference 101 of the flange 99.

The proper sleeve 51 for reception upon the extension 53 of the housing 41, should then be selected and rigidly mounted thereupon, permitting journalling of the collar 11 for free rotation about the axis of the axle housing 41, this axis, as will readily be understood, passing through the center of the circle which it is desired that the braking areas of the friction elements 33 describe. The collar 11 should be slid inwards upon the sleeve 51, until the indicating portion 23 of the gauge 17, extends into the space 98, care being taken to prevent displacement of the gauge 17 from its accurate positioning. In this position, the collar 11 should be rotated slowly, and the position of the friction elements 33 in respect to the gauge 17, observed. This may be carried out either visually or by the employment of a suitable thickness gauge. It is readily apparent that any deviation of the friction elements 33 from true circularity, may readily be ascertained. If the deviation thus made manifest to the operator, is of such an extent that correction thereof is warranted, the friction elements 33 should be spread by the adjusting means (not shown) with which such braking mechanisms are conventionally supplied.

Inasmuch as the next operation is to mount the grinder 60 with the inner grinding face of the emery wheel 64, at the accurate radial distance from the axis of the collar 11, coinciding with the radius of the desired circle of the friction elements 33, the collar 11 should next be removed from the sleeve 51, and reinserted upon the arbor 36. After removal of the gauge 17, the gauge 81 should be substituted therefor, and it should be locked to the arm 13 in that position in which it just engages the braking area of the flange 99, and with the offset portion 88 extending outwards from the portion 81, to the portion 87, with the result that the finger 87 is disposed at a greater radial distance from the collar 11, than the socket 82. This will permit the grinder 60 to be mounted upon the arm 13, and clamped rigidly thereto in that position in which the inner face of the emery wheel 64 just engages the working face 86 of the finger 87, as clearly shown upon Figs. 3 and 5. The gauge 81 should then be removed without disturbing the setting of the grinder 60. Thus the grinder 60 is accurately positioned with the effective radial distance of the emery wheel 63 from the axis of the collar 11, coinciding with the radius of the circle desired for the friction elements 33.

It is obvious that replacement of the collar 11 upon the arbor 36, and the substitution of the gauge 81 for the gauge 17, may be dispensed with, if both gauges 16 and 17 be constructed to have the same configuration as the gauge 81 which is the same as the gauges 16 and 17, with the exception that its indicating portion 87 is angularly displaced from the socket 83, and hence from the arm 13 when mounted in operative position, from the axis of the arm 13, and also displaced to a greater radial distance from the axis of the collar 11, than the socket 82.

With the grinder 60 thus accurately positioned upon the arm 13, the motor 61 should be energized to rotate the emery wheel 63 at the proper speed. Then the grinder 60 should be advanced slowly, to insert the emery wheel 63 into the space 98. This may be effected by means of the feeding screw 68, or simply by pushing the collar 11 further onto the sleeve 51. However, inasmuch as the emery wheel 64 will engage a portion of one of the friction elements 33 while being so advanced, this movement of the grinder 60 should be effected relatively slowly, to give the emery wheel 63 opportunity to abrade the surface of the friction elements 33. The collar 11 and arm 13 should then be moved slowly, to advance the emery wheel 63, circumferentially about the friction elements 33, until a complete revolution has been effected, whereupon the grinder 60 should be advanced further into the space 98, and another revolution executed. This should be continued until the entire exterior surface of the friction elements 33, has been ground down by the emery wheel 63, with the result that these friction elements will be accurately ground to true circular configuration.

As will readily be understood, the setting of the friction elements 33, just prior to their being ground, and the grinding thereof, should be carried out with the brake activating mechanism advanced substantially a third of its entire stroke, the purpose being to grind the friction elements 33 in that position in which they actually engage the surface 101 of the drum 32, to develop their maximum braking action.

After the grinding has been completed, the collar 11 and sleeve 51 should be removed, and, after removal of the arbor 36 from the wheel 31, the wheel 31 should again be mounted in operative position upon the housing 41, thus again putting the automobile in condition for service.

Various changes may be made in the details of the invention as herein described, without departing from the scope thereof as defined by the appended claim.

I claim:

A device for truing friction elements cooperative with a brake drum in a braking mechanism, said device comprising in combination: a collar, an arm extending rigidly therefrom, means for removably mounting said collar for rotation about an axis coincident with that of the drum, a gauge removably securable to said arm and adjustable in respect thereto to engage the braking surface of the drum, cutting means adjustably securable to said arm, means for adjusting said cutting means to an effective radial distance from the axis of said collar coincident with the corresponding radius of the gauge, and means for journalling said collar for rotation about an axis coincident with that of said friction elements.

NEWELL W. RHYNE.